United States Patent
Matsukawa et al.

(10) Patent No.: US 7,335,064 B2
(45) Date of Patent: Feb. 26, 2008

(54) MEMORY CARD CONNECTOR

(75) Inventors: Jun Matsukawa, Yamato (JP);
Mitsuhiro Tomita, Yamato (JP);
Yasuyoshi Matsumoto, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/529,659

(22) PCT Filed: Oct. 3, 2003

(86) PCT No.: PCT/US03/31616

§ 371 (c)(1),
(2), (4) Date: Oct. 21, 2005

(87) PCT Pub. No.: WO2004/032288

PCT Pub. Date: Apr. 15, 2004

(65) Prior Publication Data

US 2006/0148322 A1    Jul. 6, 2006

(30) Foreign Application Priority Data

Oct. 3, 2002  (JP) .............................. 2002-290657

(51) Int. Cl.
*H01R 24/00*  (2006.01)
(52) U.S. Cl. ...................................... 439/630; 439/607
(58) Field of Classification Search .............. 439/630, 439/607
See application file for complete search history.

(56) References Cited

U.S. PATENT DOCUMENTS

| 5,013,255 | A  | * | 5/1991 | Juret et al. ................... 439/260 |
| 5,313,364 | A  |   | 5/1994 | Omori et al. |
| 6,394,827 | B2 | * | 5/2002 | Nogami ...................... 439/159 |
| 6,394,843 | B1 | * | 5/2002 | Chang et al. ............... 439/607 |

FOREIGN PATENT DOCUMENTS

| JP | 6171275    | 6/1994 |
| JP | 11185862   | 7/1999 |
| JP | 2000243517 | 9/2000 |
| JP | 2001076813 | 3/2001 |

* cited by examiner

*Primary Examiner*—James Harvey
*Assistant Examiner*—Travis Chambers
(74) *Attorney, Agent, or Firm*—Charles S. Cohen

(57) ABSTRACT

A memory card connector includes an interior cavity for receiving a memory card. An insulating housing has a rear terminal-mounting section and at least one longitudinal side wall section extending forwardly from one end of the rear section. A metal shell covers at least a portion of the insulating housing and includes a cover plate overlying at least a portion of the longitudinal side wall section of the housing An engaging structure includes an engaging projection on one of the cover plate of the metal shell or the top surface of the side wall section of the housing extending into an engaging opening in the other of the cover plate or top surface to prevent relative movement therebetween in a plane generally parallel to the cover plate and top surface. A slight clearance is provided between the engaging projection and the engaging opening to avoid creating residual stresses in the housing.

8 Claims, 6 Drawing Sheets

MEMORY CARD CONNECTOR

FIELD OF THE INVENTION

This invention generally relates to the art of electrical connectors and, particularly, to a memory card connector.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, music players, ATMs, cable television decoders, toys, games, PC adapters, multi-media cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card. Ejecting devices often are provided for facilitating inserting and ejecting the memory card to and from the card connector.

A typical memory card connector includes an insulating housing structure usually having a lateral terminal-mounting section across the rear of the connector. The contacts or terminals of the connector are mounted on this lateral section. An overlying shell substantially covers the insulating housing and includes a cover plate defining a top of a cavity for receiving a memory card. The housing may have one or two legs projecting at right angles forwardly from one or both sides of the lateral section to define opposite sides of the cavity. The shell has a pair of side walls overlying the side legs of the housing. For example, see Japanese Unexamined Patent Publication (Kokai) No. 2001-291552. As stated above, an ejecting device may be provided for facilitating inserting and ejecting the memory card. The ejecting device may include a slider movably mounted on the housing and engageable with the memory card for movement therewith.

The insulating housing of such connectors typically is molded of dielectric plastic material into the desired shape. The terminals are stamped and formed of a sheet metal material having a high resiliency, such as phosphor bronze. The metal shell is stamped and formed of a conductive sheet metal, such as stainless steel. The connector often is mounted on the top surface of a printed circuit board, and solder tail portions of the terminals are connected, as by a reflow soldering process, to appropriate circuit traces on the board. Metal securing nails and/or portions of the metal shell also are secured, as by soldering, to appropriate mounting pads on the circuit board. The heat generated by these soldering processes often create problems in deforming the housing of the connector. This is particularly true with the ever-increasing miniaturization of such memory card connectors, whereby the housings are considerably downsized, including reducing the height of the housing.

Specifically, when the plastic housing is cooled after a reflow soldering process, the plastic material of the housing tends to shrink because of the cooling, along with heat dissipation. In fact, there is a possibility that the card-receiving cavity of the connector becomes contracted or narrowed and makes it impossible to insert the card thereinto. For example, FIGS. 13 and 14 herein shows an insulating housing, generally designated 16, which includes a side wall section 18 and a mounting post 20 for insertion into an appropriate mounting hole in a printed circuit board. A metal shell 22 has a top cover plate 22a and a side wall plate 22b which overlies the outside of the side wall section of the housing. The metal shell and the housing define a card-receiving cavity 24. It can be seen in FIG. 13 that side wall section 18 normally should abut against the inside of side wall plate 22b of the metal shell and defines one side of cavity 24. It can be seen in FIG. 14 that side wall section 18 has shrunk or moved inwardly in the direction of arrow "A", away from side wall plate 22b of the metal shell and into cavity 24, as a result of cooling after a heated soldering process. As stated above, this movement of the side wall section could even prevent a card from being inserted into cavity 24.

In order to solve this problem, various approaches have been made such as is shown in Japanese Patent No. 3177774 and the like, wherein a press-fit piece 4C is provided on a metal shell 4 and is engaged in a groove 3c of an insulative housing by a press-fit under pressure (see FIG. 1). The displacement of the insulating housing thereby is restricted by press-fitting an engaging piece stamped and formed from the metal shell into an engaging groove in the insulating housing under pressure. Unfortunately, such approaches create further problems because the press-fit engagement between the engaging components create residual stresses in the plastic material of the housing. In fact, when the side wall sections of the housing are made thinner in order to reduce the size and weight of the connector, such press-fit engagements can cause torsion and deflection of the side wall sections of the housing if not the entire body of the housing. The present invention is directed to solving this myriad of problems.

SUMMARY OF THE INVENTION

An object, therefore, of the invention is to provide a new and improved memory card connector of the character described.

In the exemplary embodiment of the invention, the connector has an interior cavity for receiving a memory card. An insulating housing has a rear terminal-mounting section at the rear of the cavity. At least one longitudinal side wall section extends forwardly from one end of the rear section at one side of the cavity. The housing has a bottom surface for mounting on a circuit board, and the longitudinal side wall section has a top surface. A plurality of terminals are mounted on the rear terminal-mounting section and have contact portions for engaging contacts on the memory card. A metal shell covers at least a portion of the insulating housing and includes a cover plate overlying at least a portion of the longitudinal side wall section of the housing. An engaging structure includes an engaging projection on one of the cover plate of the metal shell or the top surface of the side wall section of the housing extending into an opening in the other of the cover plate or top surface to prevent relative movement therebetween in a plane generally parallel to the cover plate and top surface. There is a slight clearance between the engaging projection and the engaging opening to avoid creating residual stresses in the housing.

According to one embodiment of the invention, the insulating housing is generally L-shaped, with the terminal-mounting section extending transversely across the rear of the cavity and with the longitudinal side wall section having a distal end. The engaging projection is near the distal end of the side wall section and projects from the top surface thereof for engagement in an engaging opening in the cover plate of the housing.

In another embodiment of the invention, the insulating housing is generally U-shaped, with the terminal-mounting section extending transversely across the rear of the cavity and including a pair of the longitudinal side wall sections extending forwardly from both opposite ends of the rear section. One of the engaging projections is provided near a distal end of each side wall section and projects from the top surface thereof into a respective engaging opening in the cover plate of the housing.

According to one aspect of the invention, the engaging opening is provided by a hole in the top surface of the side wall section of the housing for receiving, with slight clearance, the engaging projection on the cover plate of the metal shell. The shell is stamped and formed of sheet metal material, and the engaging projection is provided by a tab stamped and formed out of an aperture in the cover plate of the metal shell.

According to another aspect of the invention, a metal securing nail is fixed to the insulating housing and has a foot portion for securing to an appropriate mounting pad on the circuit board. The metal securing nail is fixed to the housing adjacent the engaging structure. The metal shell has a grounding tab formed into engagement with the metal securing nail to provide a ground potential.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
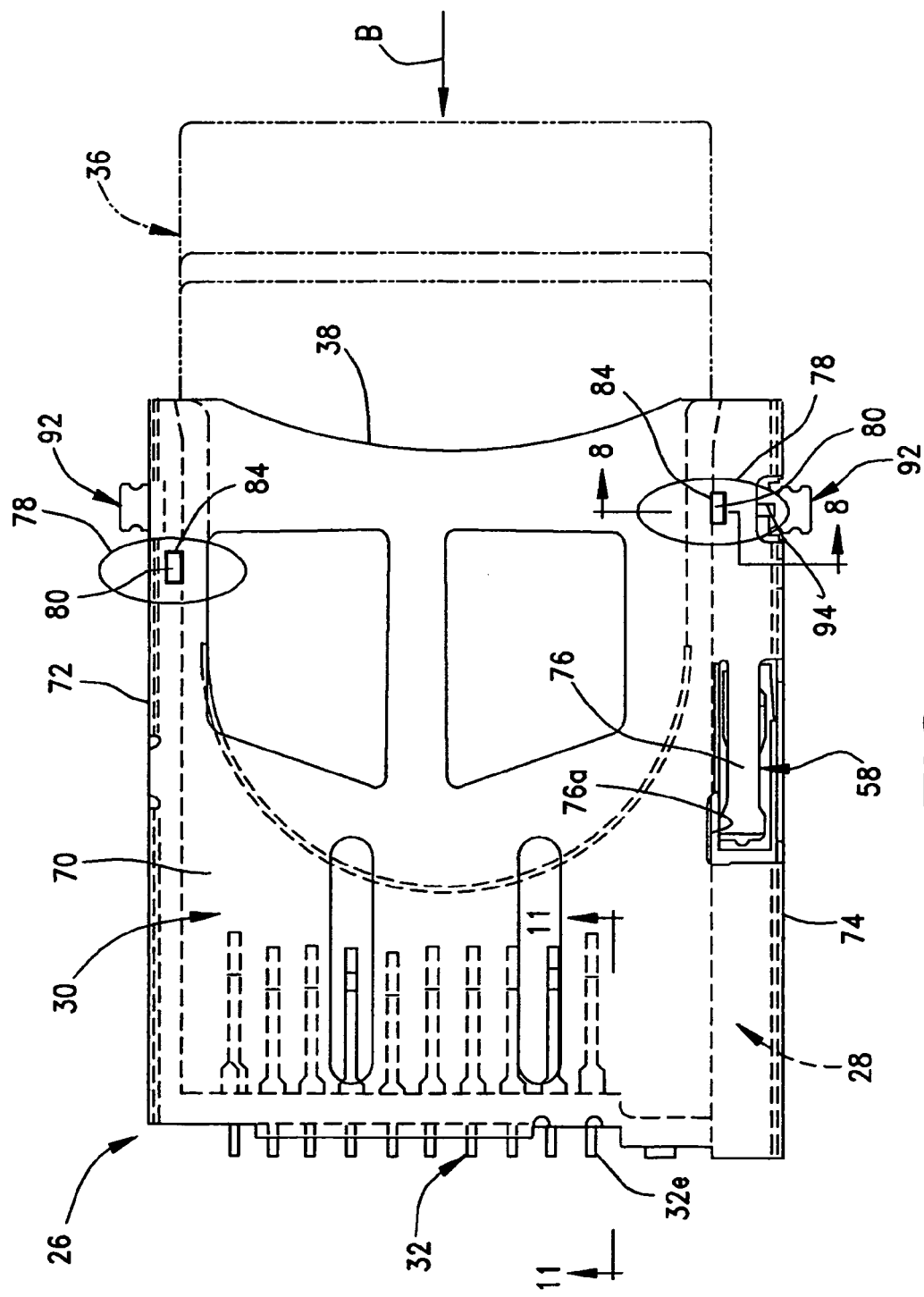
FIG. 1 is a top plan view of one embodiment of a memory card connector incorporating the concepts of the invention.
Figure 2:
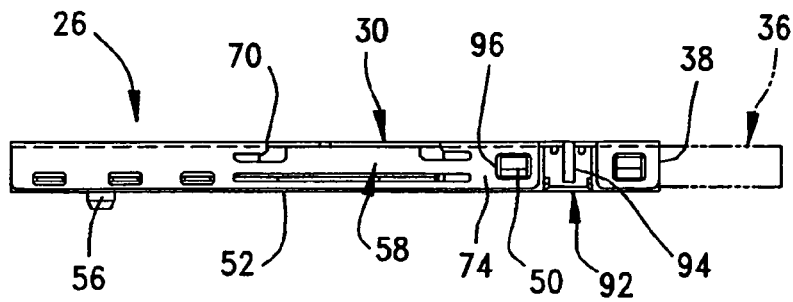
FIG. 2 is a side elevational view of the connector, looking at the bottom or right-hand side of FIG. 1.
Figure 3:
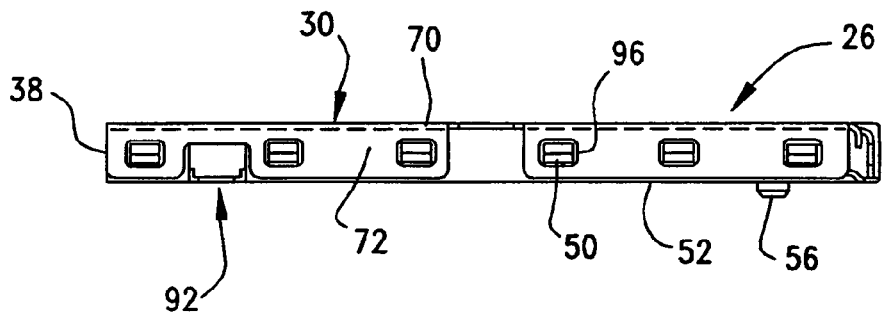
FIG. 3 is a side elevational view opposite the side of FIG. 2.
Figure 4:
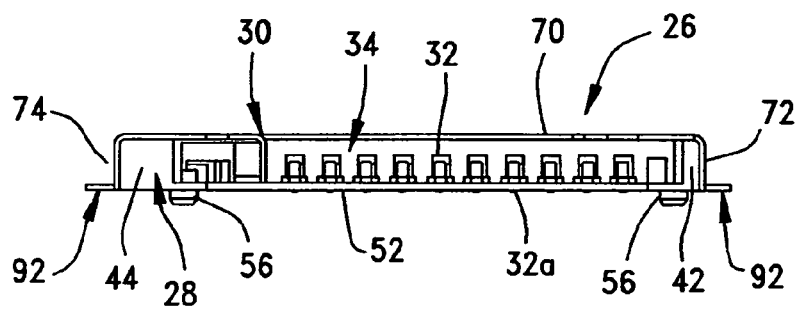
FIG. 4 is a front elevational view of the connector.
Figure 5:
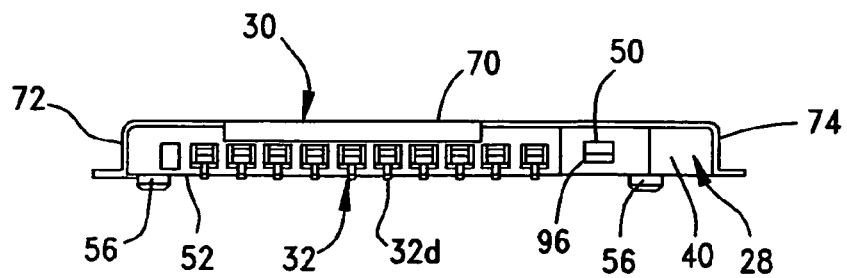
FIG. 5 is a rear elevational view of the connector.

Referring to the drawings in greater detail, and first to FIGS. 1-6, the invention is embodied in a memory card connector, generally designated 26, which includes a molded plastic insulating housing, generally designated 28, and a stamped and formed sheet metal shell, generally designated 30, covering the insulating housing. The housing mounts a plurality of conductive terminals, generally designated 32, mounted on the housing in a side-by-side array transversely across a rear of the housing as seen best in FIG. 6. The housing and metal shell 30 combine to define a cavity, generally designated 34 (FIG. 4), for receiving a memory card, generally designated 36, inserted into a front receptacle area 38 (FIG. 1) in the direction of arrow "B".

Figure 6:
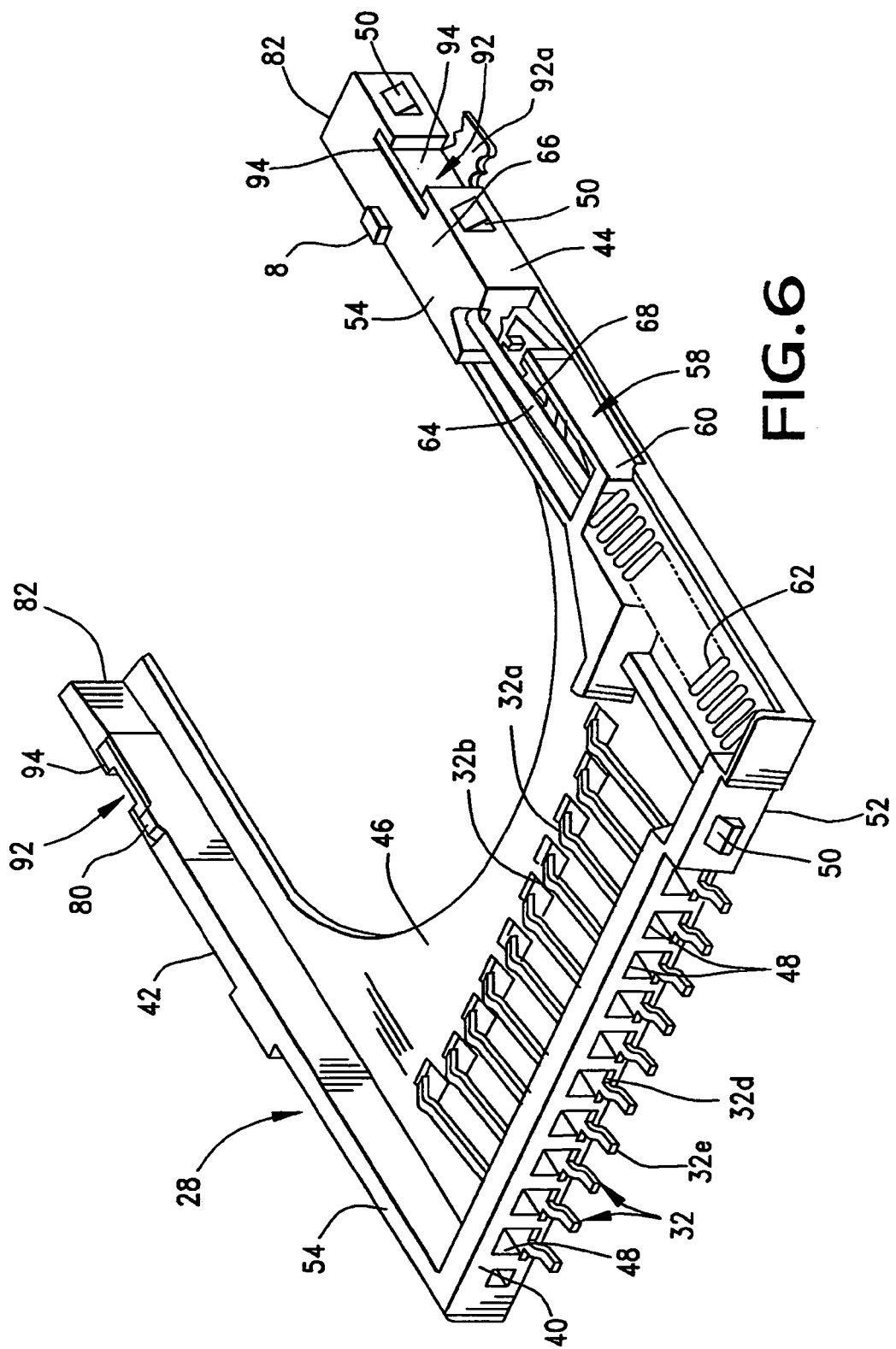
FIG. 6 is a perspective view of the connector, with the metal shell removed.

Insulating housing 28 is shown best in FIG. 6 but also in conjunction with FIG. 1. The housing is generally U-shaped to define a terminal-mounting section 40 which extends transversely across the rear of the housing, along with a pair of longitudinal side wall sections 42 and 44 at opposite sides of a thin bottom plate 46. Side wall sections 42 and 44 extend forwardly at opposite ends of rear terminal-mounting section 40, generally at right-angles thereto. A plurality of terminal-receiving passages 48 extend through rear terminal-mounting section 40. For purposes to be described in greater detail hereinafter, a plurality of latch bosses 50 project outwardly from the sides and the rear of the housing. The housing has a bottom surface 52 for mounting on a printed circuit board, and longitudinal side wall sections 42 and 44 have top surfaces 54.

Figure 11:
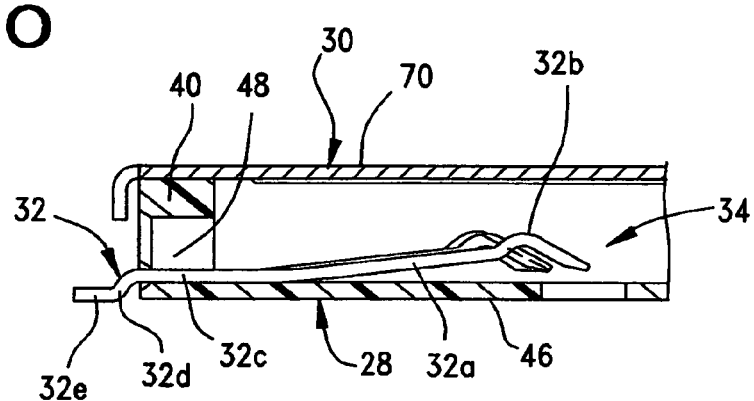
FIG. 11 is an enlarged, fragmented vertical section taken generally along line 11-11 in FIG. 1.
Figure 13:
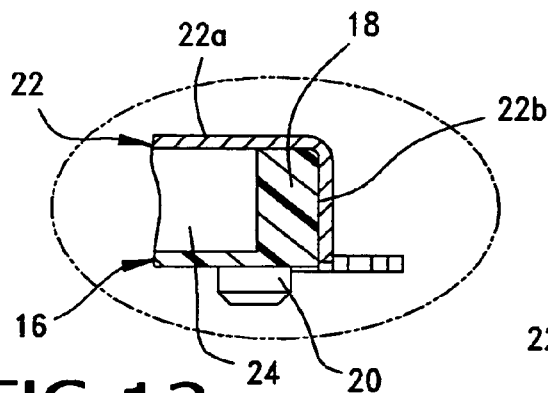
FIGS. 13 and 14 are fragmented sectional views of the prior art described in the "Background", above.
Figure 14:
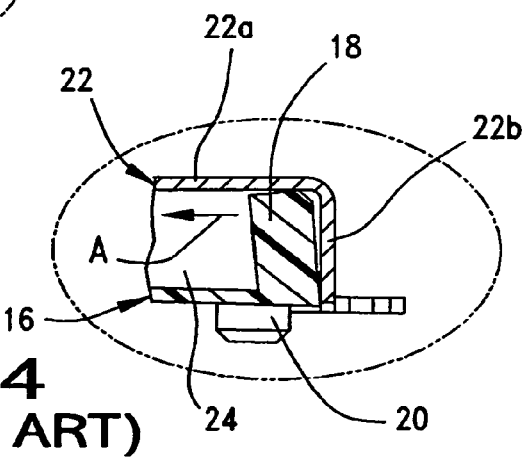

Referring to FIG. 11 in conjunction with FIG. 6, each terminal 32 includes a contact arm 32a cantilevered forwardly in the card-receiving cavity 34 and terminating in a contact portion 32b for engaging a respective one of a plurality of contacts on the bottom surface of memory card 36. Contact arm 32a projects forwardly from a mounting base 32c of the terminal which is press-fit into a respective one of the terminal-receiving passages 48 in terminal-mounting section 40 of the housing. A solder tail portion 32d of the terminal projects outwardly of the rear of the housing and terminates in a soldering pad 32e for solder-connection to a respective circuit trace on a printed circuit board (not shown). The housing has a plurality of mounting pegs 56 (FIGS. 2-5) for insertion into appropriate mounting holes in the printed circuit board.

Referring to FIG. 6, longitudinal side wall section 44 of housing 28 mounts a push/pull-type card ejection mechanism, generally designated 58. The card ejection mechanism is provided for ejecting and removing memory card 36 from the connector and is of a type known in the art. For instance, see Japanese Unexamined Patent Publication No. 2001-291552. Suffice it to say, the ejection mechanism includes a cam slider 60 slidable on bottom plate 46 of the housing, a coil spring 62 for biasing the cam slider toward the front receptacle area 38 (FIG. 1) of the connector, a pin member 64 interconnected between a mounting block portion 66 of longitudinal side wall section 44 and a heart-shaped cam slot 68.

Referring to FIGS. 1-5, metal shell 30 is stamped and formed of sheet metal material, such as stainless steel or the like, and is large enough to cover substantially the entire area defined by insulating housing 28. The metal shell includes a top cover plate 70 and a pair of depending opposite side wall plates 72 and 74 which run in a front-to-rear direction of the connector, whereby the overall connector is of a generally inverted U-shaped configuration. Side wall plate 74 covers card ejection mechanism 58, and a cantilevered spring 76 (FIG. 1) is stamped and formed out of an opening 76*a* in top cover plate 70 to biasingly engage pin member 64 (FIG. 6) of the card ejection mechanism.

Generally, the invention contemplates an engaging structure cooperating between metal shell 30 and longitudinal side wall sections 42 and 44 of housing 28 to prevent the side wall sections from shrinking and/or moving when the plastic material thereof cools after a reflow soldering process, for instance. The engaging structure is encircled at 78 in FIG. 1 and is generally indicated at 78 in FIGS. 7 and 8. Specifically, as seen in FIG. 6 in conjunction with FIGS. 1, 7 and 8, an engaging projection 80 in the form of a rectangular boss projects upwardly from top surface 54 of each longitudinal side wall section 42 near a distal end 82 of each side wall section. Each engaging projection or boss 80 projects into a respective engaging opening 84 in cover plate 70 of metal shell 30. As indicated specifically at 86 in FIGS. 7 and 8, a slight clearance is provided between each engaging projection or boss 80 and its respective engaging opening 84. The slight clearance 86 between each engaging projection and its respective engaging opening avoids the creation of any residual stresses in the molded plastic housing.

Figure 9:
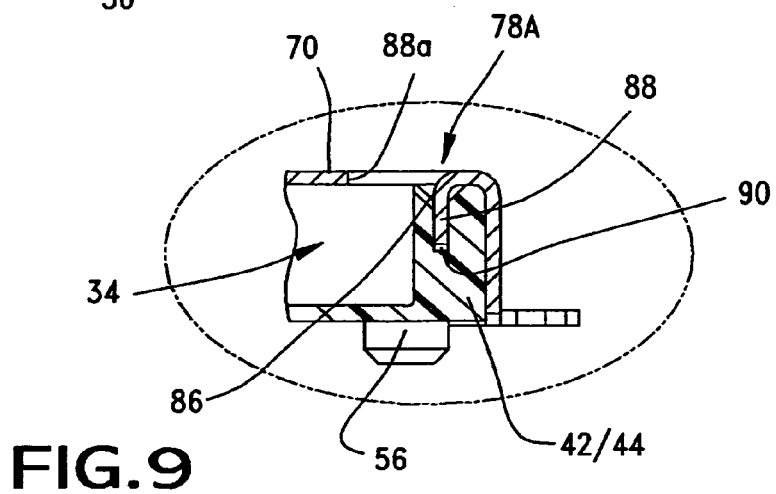
FIG. 9 is a view similar to that of FIG. 8, but of a second embodiment of the invention.

FIG. 9 shows a second embodiment of an engaging structure, generally designated 78A. In this embodiment, an engaging projection in the form of an engaging tab 88 is stamped and formed out of an opening 88*a* in cover plate 70 of the metal shell. Engaging. projection or tab 88 is inserted into an engaging opening 90 in either one or both of the side wall sections 42 and/or 44. Again, a slight clearance 86 is maintained between engaging projection 88 and engaging opening 90 to avoid creating any residual stresses in the plastic material of the side wall section of the housing.

Figure 10:
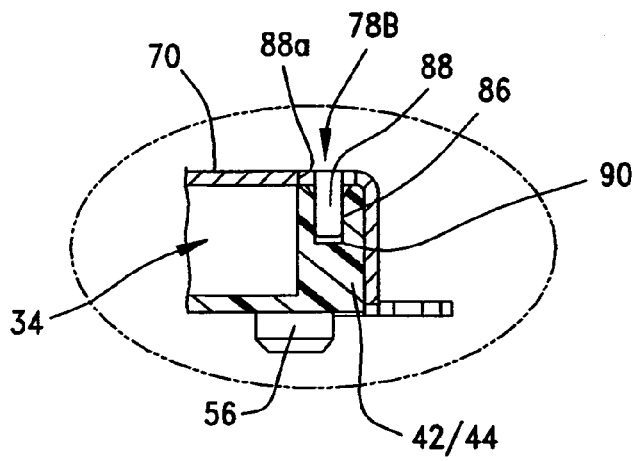
FIG. 10 is a view similar to that of FIGS. 8 and 9, but of a third embodiment of the invention.

FIG. 10 shows a third embodiment of an engaging structure, generally designated 78B, which is similar to the second embodiment in FIG. 9. Again, an engaging projection or tab 88 is stamped and formed out of an opening 88*a* in cover plate 70 of the metal shell. The engaging projection or tab 88 is inserted into an engaging opening 90 in side wall section 42 and/or 44. A slight clearance 86 is maintained between the engaging tab and the engaging opening to avoid creating any residual stresses in the plastic material of the side wall section(s) of the housing.

Figure 7:
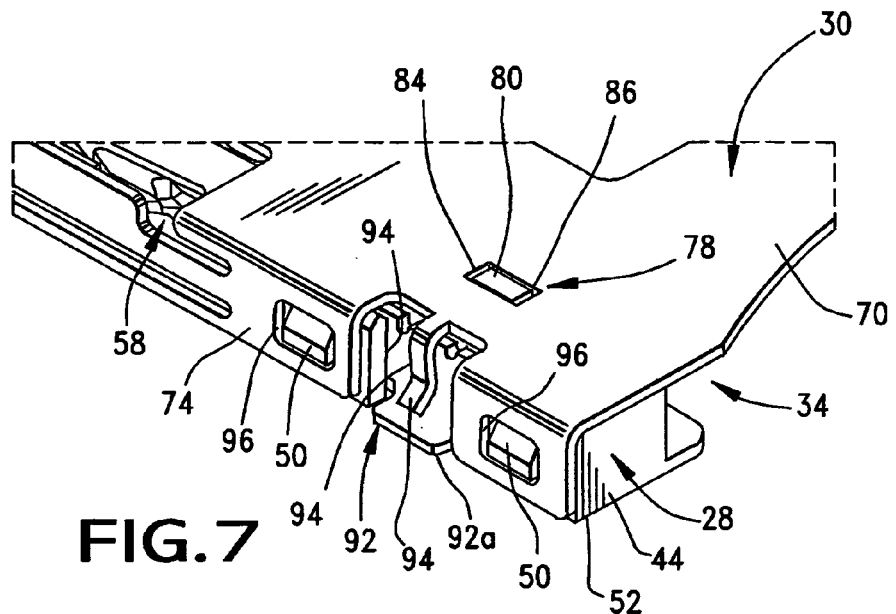
FIG. 7 is an enlarged perspective view of the bottom right-hand corner of the connector as viewed in FIG. 1.
Figure 8:
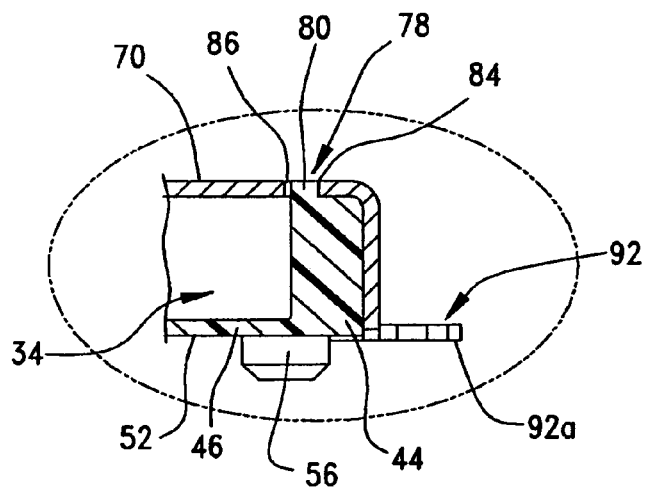
FIG. 8 is an enlarged, fragmented vertical section taken generally along the offset line 8-8 in FIG. 1.

As seen in FIG. 1, a metal securing nail, generally designated 92, is inserted into a slot 94 (FIG. 7) in each side wall section of the housing. Each metal securing nail has a foot portion 92*a* for securing, as by soldering, to an appropriate mounting pad on the circuit board. Each securing nail is located adjacent one of the engaging structures 78, described above. As seen clearly in FIG. 7, a grounding tab 94 is stamped and formed out of cover plate 70 of the metal shell and includes a flexible contact portion 94*a* which is engageable with metal securing nail 92 to provide a ground potential. FIG. 7 also shows that the depending walls of the metal shell have openings 96 which snap over latch bosses 50 on the housing to latchingly engage the shell to the housing.

Figure 12:
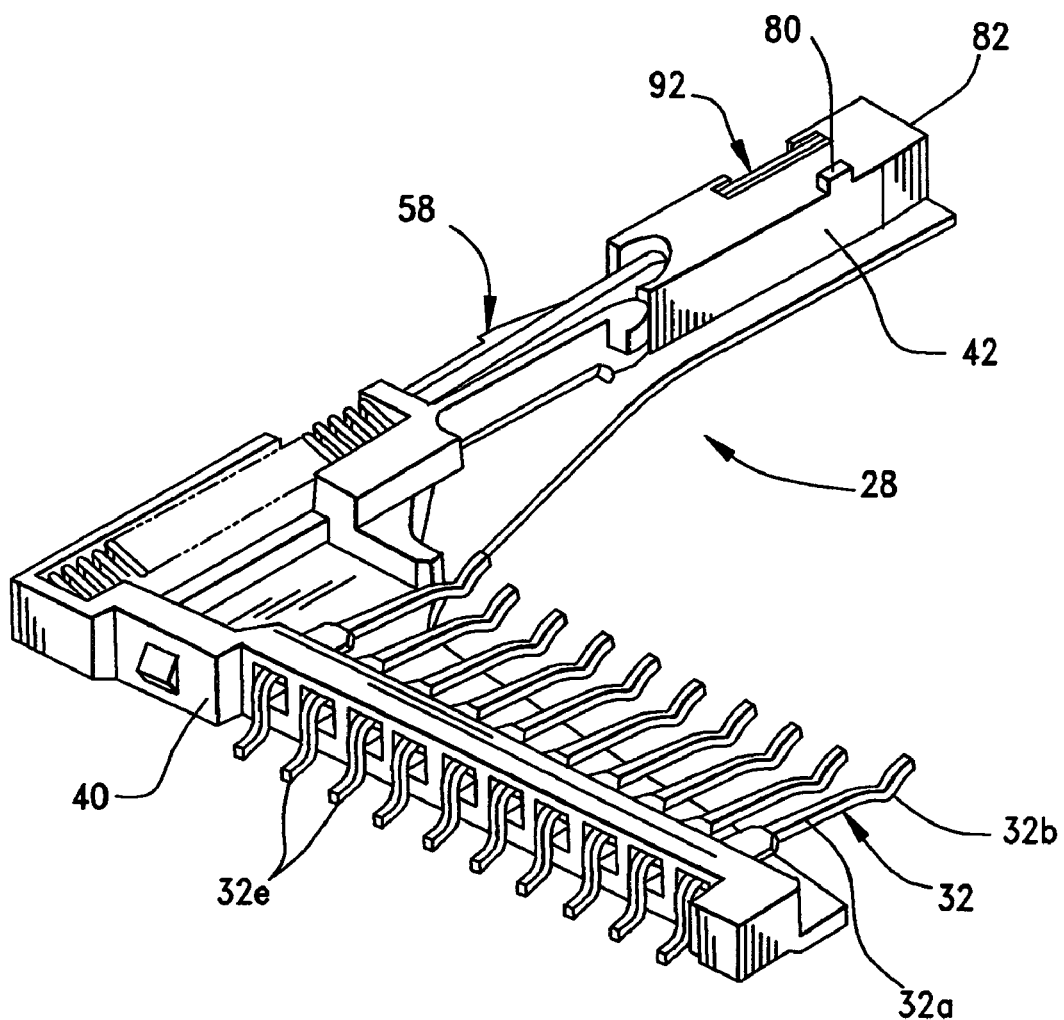
FIG. 12 is a perspective view of an alternative embodiment of a housing versus the embodiment shown in FIG. 6.

Lastly, FIG. 12 shows a modified form of a housing 28 which is L-shaped versus the U-shaped housing of FIG. 6. Like numerals have been applied in FIG. 12 for like components described above. In other words, the housing in FIG. 12 includes a rear terminal-mounting section 40, but only one side wall section 42 on which is mounted a card ejection mechanism 58. According to the invention, an engaging projection 80 projects upwardly from side wall section 42 near distal end 82 thereof. As with the first embodiment of FIGS. 1-8, engaging projection 80 will project into an opening 84 in the cover plate of the metal shell, while maintaining a slight clearance between the engaging projection and the engaging opening.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector having an interior cavity for receiving a memory card, comprising:
    an insulating housing having a rear terminal-mounting section at the rear of the cavity, and at least one longitudinal side wall section extending forwardly from one end of the rear section at one side of the cavity, the longitudinal side wall section including a distal end, the housing having a bottom surface for mounting on a circuit board, and the longitudinal side wall section having a top surface opposite said bottom surface;
    a plurality of terminals mounted on the rear terminal-mounting section of the housing and having contact portions for engage contacts on the memory card;
    a metal shell covering substantially the entire area defined by the insulating housing and including a cover plate overlying at least a portion of the longitudinal side wall section of the housing;
    an engaging structure including an engaging projection on the top surface of said side wall section of the housing extending into an engaging opening in the cover plate of the metal shell to prevent relative movement therebetween in a plane generally parallel to the cover plate and top surface; and
    further including clearance between the engaging projection and the engaging opening to avoid creating residual stresses in the housing.

2. The memory card connector of claim 1 wherein said insulating housing is generally L-shaped with said terminal-mounting section extending transversely across the rear of the cavity, said engaging projection being near the distal end of the side wall section and projecting from the top surface thereof for engagement in an engaging opening in the cover plate of the metal shell.

3. The memory card connector of claim 1 wherein said insulating housing is generally U-shaped with said terminal-mounting section extending transversely across the rear of the cavity and including two of said longitudinal side wall sections extending forwardly from both opposite ends of the rear section, and including one of said engaging projections near a distal end of each side wall section and projecting from the top surface thereof into a respective engaging opening in the coverplate of the metal shell.

4. The memory card connector of claim 1, including a metal securing nail fixed to the insulting housing and having a foot portion for securing to an appropriate mounting pad on the circuit board.

5. The memory card connector of claim 4 wherein said metal securing nail is fixed to the housing adjacent said engaging structure.

6. A memory card connector having an interior cavity for receiving a memory card, comprising:
    an insulating housing having a rear terminal-mounting section at the rear of the cavity, and at least one longitudinal side wall section extending forwardly from one end of the rear section at one side of the cavity, the longitudinal side wall section including a distal end, the housing having a bottom surface for mounting on a circuit board, and the longitudinal side wall section having a ton surface opposite said bottom surface;

a plurality of terminals mounted on the rear terminal-mounting section of the housing and having contact portions for engage contacts on the memory card;

a metal shell covering substantially the entire area defined by the insulating housing and including a cover plate overlying at least a portion of the longitudinal side wall section of the housing;

an engaging structure including an engaging projection on the top surface of said side wall section of the housing extending into an engaging opening in the cover plate of the metal shell to prevent relative movement therebetween in a plane generally parallel to the cover plate and top surface, wherein there being clearance between the engaging projection and the engaging opening to avoid creating residual stresses in the housing;

a metal securing nail fixed to the insulating housing and having a foot portion for securing to an appropriate mounting pad on the circuit board, said metal securing nail being fixed to the housing adjacent said engaging structure; and wherein said metal shell includes a grounding tab formed into engagement with said metal securing nail to provide a ground potential.

7. A memory card connector having an interior cavity for receiving a memory card, comprising:

an insulating housing having a rear terminal-mounting section at the rear of the cavity, and at least one longitudinal side wall section extending forwardly from one end of the rear section at one side of the cavity, the longitudinal side wall section including a distal end, the housing having a bottom surface for mounting on a circuit board, and the longitudinal side wall section having a top surface opposite said bottom surface;

a plurality of terminals mounted on the rear terminal-mounting section of the housing and having contact portions for engage contacts on the memory card;

a metal shell covering substantially the entire area defined by the insulating housing and including a cover plate overlying at least a portion of the longitudinal side wall section of the housing;

an engaging structure including an engaging projection on the top surface of said side wall section of the housing extending into an engaging opening in the cover plate of the metal shell to prevent relative movement therebetween in a plane generally parallel to the cover plate and top surface, wherein there being clearance between the engaging projection and the engaging opening to avoid creating residual stresses in the housing;

a metal securing nail fixed to the insulating housing and having a foot portion for securing to an appropriate mounting pad on the circuit board; and wherein said metal shell includes a grounding tab formed into engagement with said metal securing nail to provide a ground potential.

8. A memory card connector having an interior cavity for receiving a memory card, comprising:

an insulating housing having a rear terminal-mounting section at the rear of the cavity, and at least one longitudinal side wall section extending forwardly from one end of the rear section at one side of the cavity, the longitudinal side wall section including a distal end, the housing having a bottom surface for mounting on a circuit board, and the longitudinal side wall section having a top surface opposite said bottom surface;

a plurality of terminals mounted on the rear terminal-mounting section of the housing and having contact portions for engage contacts on the memory card;

a metal shell covering substantially the entire area defined by the insulating housing and including a cover plate overlying at least a portion of the longitudinal side wall section of the housing;

an engaging structure including an engaging projection on the top surface of said side wall section of the housing extending into an engaging opening in the cover plate of the metal shell to prevent relative movement therebetween in a plane generally parallel to the cover plate and top surface, wherein there being clearance between the engaging projection and the engaging opening to avoid creating residual stresses in the housing;

a metal securing nail fixed to the insulating housing; and said metal shell includes a grounding tab formed into engagement with said metal securing nail to provide a ground potential.

* * * * *